United States Patent [19]
Canfield et al.

[11] 3,780,644
[45] Dec. 25, 1973

[54] MILK PROCESSING SYSTEM

[76] Inventors: Richard Canfield, R. D. No. 1, Manheim, Pa. 17545; Nelson Nafziger, R. D. No. 3, Coatesville, Pa. 19320

[22] Filed: Jan. 24, 1972

[21] Appl. No.: 220,324

[52] U.S. Cl. ................................................. 99/455
[51] Int. Cl. ........................................... A01j 11/00
[58] Field of Search ..................... 99/183, 184, 185, 99/211, 212, 452, 453, 455; 180/14 R, 65 R; 165/103

[56] References Cited
UNITED STATES PATENTS
| | | | |
|---|---|---|---|
| 3,268,342 | 8/1966 | Yatuni | 99/183 X |
| 2,256,904 | 9/1941 | Kintner | 99/453 X |
| 3,316,830 | 5/1967 | Biehl | 99/235 |

*Primary Examiner*—Billy J. Wilhite
*Assistant Examiner*—Alan I. Cantor
*Attorney*—John C. Holman et al.

[57] ABSTRACT

A novel milk processing system is disclosed which generally comprises a mobile milk processing unit mounted on a motor vehicle and by which raw milk can be processed and discharged directly at the farm, for example. In the preferred disclosed structural embodiment, the mobile unit for processing raw milk directly at the location of a source of supply thereof comprises a movable vehicle which has disposed thereon a milk processing assembly including at least a pasteurizer, means for delivering raw milk to the pasteurizer and for discharging processed milk therefrom, means for circulating water as a heat transfer medium through the pasteurizer, and electrically operable temperature conditioning means for selectively heating and cooling the circulating water. The mobile unit further carries an electrical generator which, in the preferred inventive embodiment, is itself driven by the motor of the movable vehicle, or by an auxiliary motor the vehicle being contemplated to comprise a tractor/trailer combination. The electrical generator provides electric power for operating at least the milk processing assembly and the temperature conditioning means disposed on the vehicle. By so utilizing an electrical generator as the power source, marked savings in economy, size, and weight can be achieved over conventional steam-operated apparatus and related machinery, thus enabling production of a commercially feasible mobile milk processing system.

9 Claims, 6 Drawing Figures

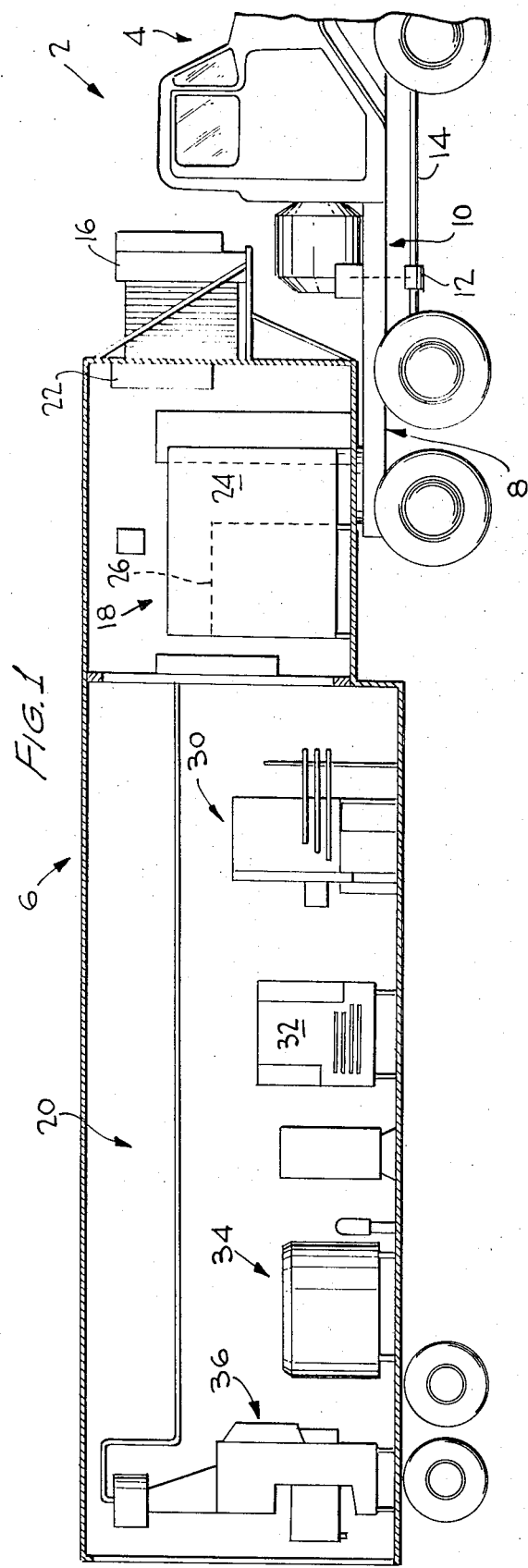
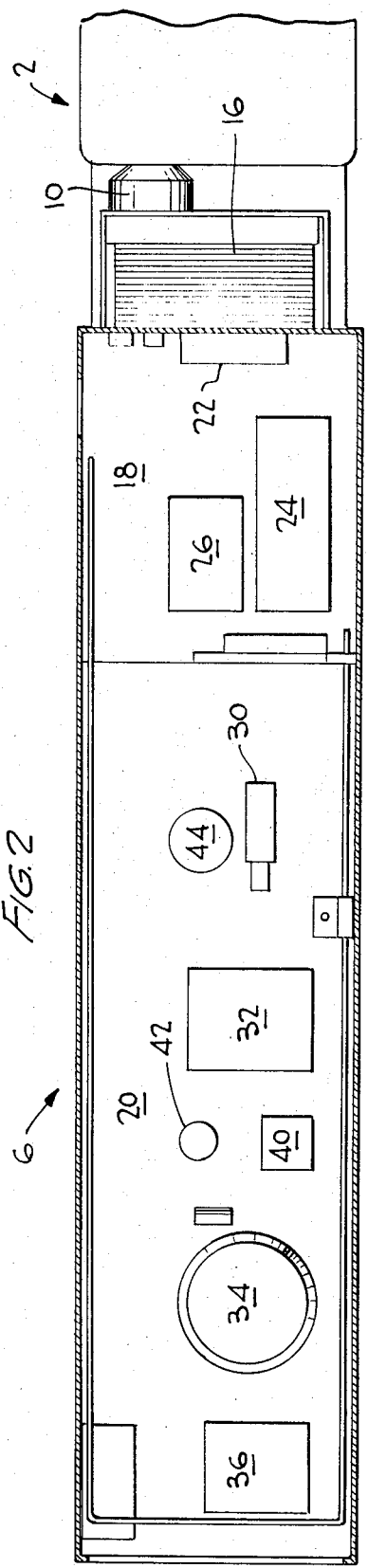

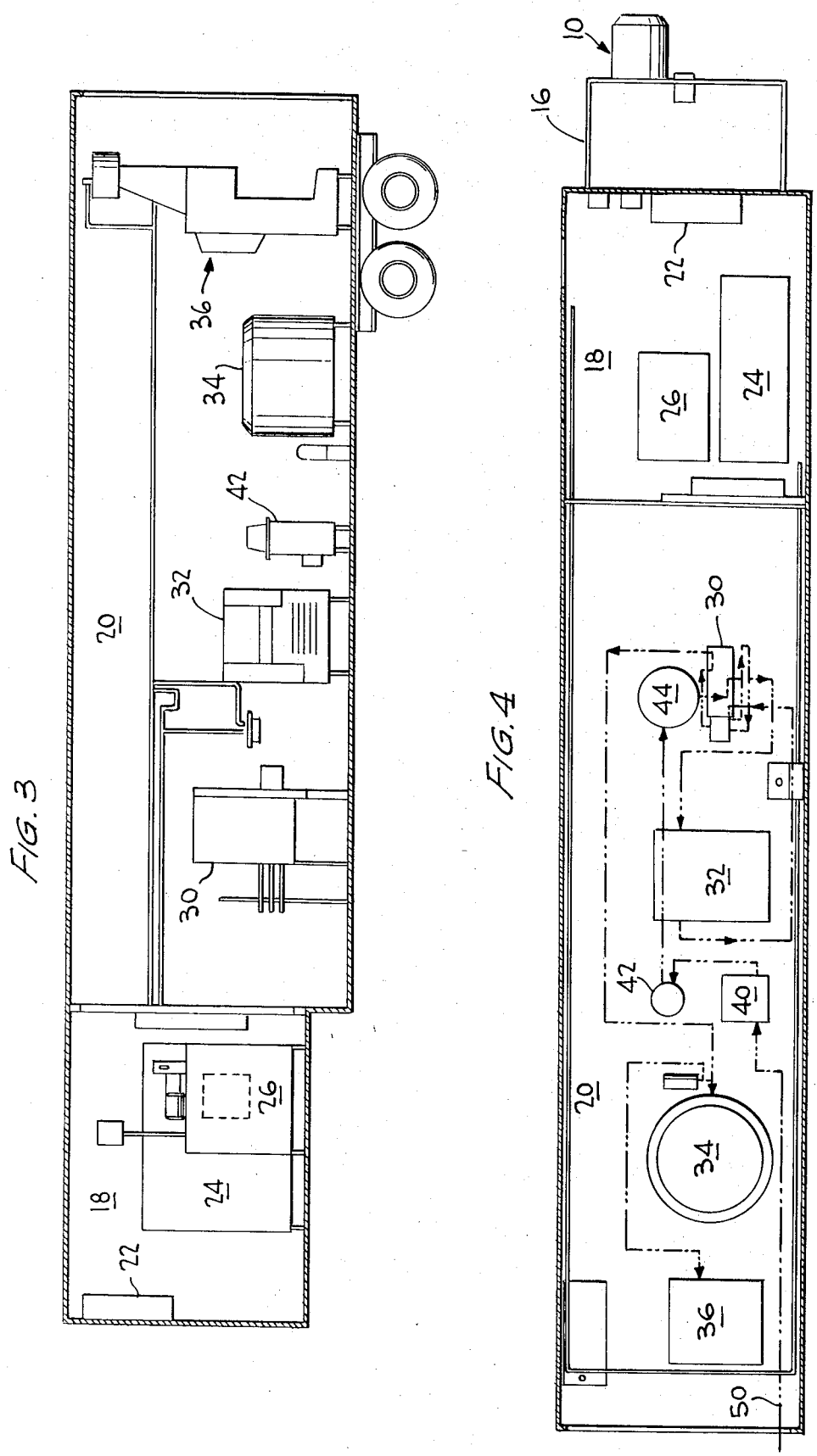

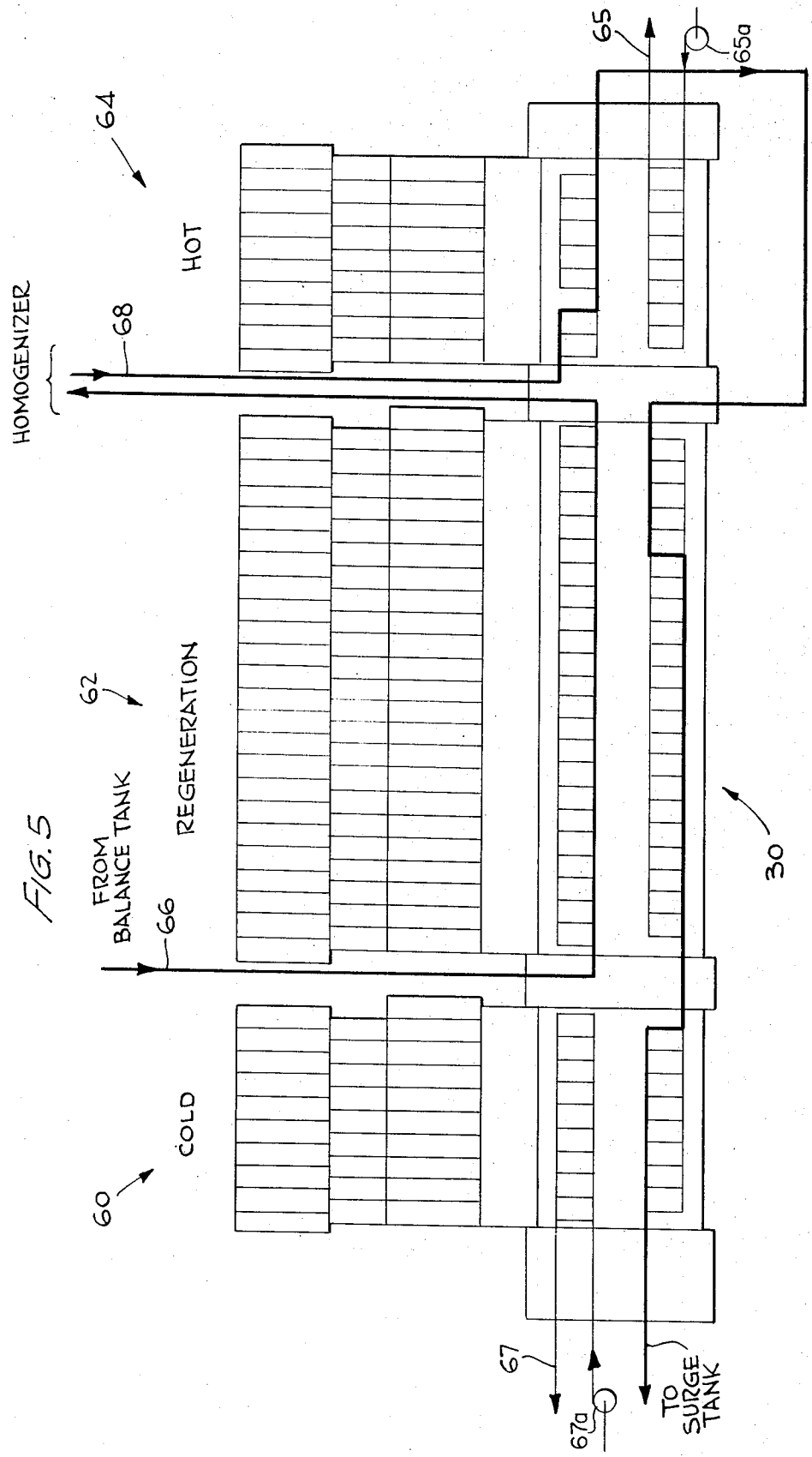

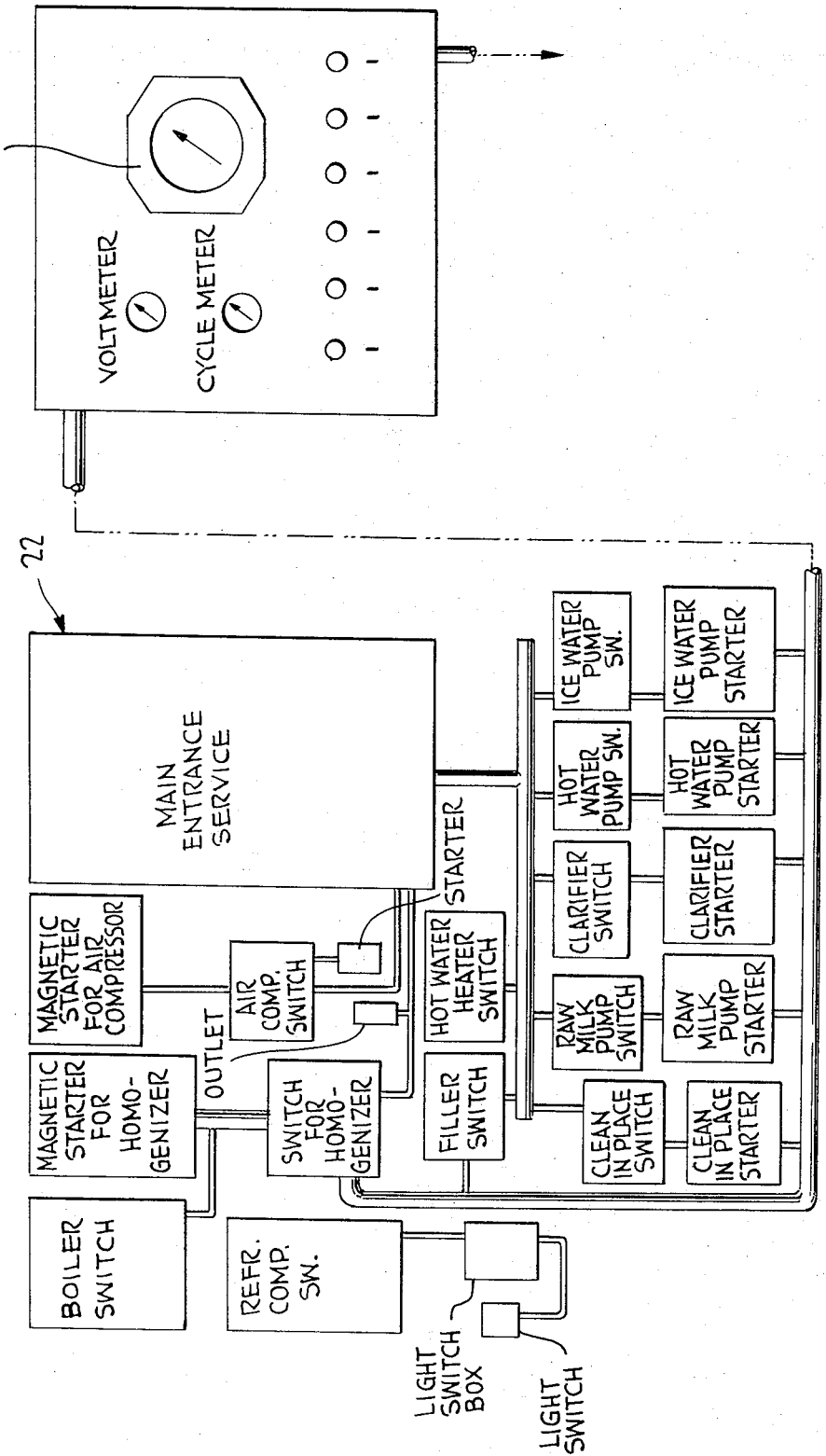

MILK PROCESSING SYSTEM

BACKGROUND OF THE INVENTION

This invention generally relates to milk processing systems and particularly concerns a mobile milk processing system adapted to be mounted upon a motorized vehicle so that milk processing and discharge of the processed milk can be effected directly at the location of a source of raw milk, such as a farm, for example.

In general, pasteurized and/or homogenized milk is presently obtained from various stationary milk processing plants, to which plants the raw milk is brought from the source of supply, such as the farm. The typical stationary plant incorporates a pasteurization unit in which temperature control thereof is effected through the utilization of steam. With the conventional stationary plant, therefore, a rather sizeable boiler room is therefore provided so as to enable generation of suitable temperatures and pressures for the pasteurizing equipment. In short, the stationary milk processing plants of conventional construction requires a substantial economic investment along with sophisticated machinery and boiler equipment so as to effect operation thereof.

With typical milk distribution schemes, a plurality of such stationary milk processing plants are usually disposed at several different locations throughout a milk producing region so that any given location comprising a source of raw milk, such as a farm, would be conveniently disposed with respect to one or another of such plants. The farmer producing the raw milk then would arrange to have such milk delivered to a given stationary milk processing plant, whereat the milk would be processed, discharged in containers, for example, and subsequently distributed to retail outlets.

Thus, milk distribution as is presently known requires the intermediate step of delivery of raw milk from its source, the farm, to some remotely disposed stationary milk processing plant, and only then is the processed milk delivered to and sold at retail outlets. Of course, by having to utilize the services of an intermediary, the operator of the stationary milk processing plant, the farmer himself, receives a reduced return on his raw milk from an economic standpoint. It would therefore be highly advantageous, from a commercial and economic standpoint, if the farmer himself could process such raw milk directly at its original location, the farm.

However, unless any given farm is of an unusually substantial size, the farmer/operator thereof would not find it advantageous to install his own "in-house" stationary milk processing plant. Such a plant would only be used for a limited time, such as a few hours a week, and the investment required for the typical stationary plant, approximately $50,000, would far exceed the commercial benefit to be expected. Since the laws of most jurisdictions generally provide that the farmer can only sell processed milk at competitive prices to the public which has not left his own property, the average farmer finds himself in a position wherein he can sell raw milk to the public presuming that the public will buy raw milk, but any excess of his milk production over that which he can sell in raw or unprocessed form must be taken from his farm to a remote stationary milk processing plant. It is for this reason that most all processed milk sold in retail outlets comes from some stationary milk processing plant which is remote from the source of raw milk itself, the farm.

If a mobile milk processing system were available, such as a system which could be transported from farm to farm to process milk directly at the farm location, the farmer's income from the production of raw milk could be greatly increased. However, in view of the nature of the stationary milk processing plants as presently known, it was generally considered impossible to provide a suitable and commercially operable mobile milk processing system which could in fact be moved from to farm to farm whereat the entire processing procedure could be carried out. However, mobile milk processing units per se are not unknown as there has been at least one prior suggestion thereof such as that depicted in U.S. Pat. No. 3,268,342. The unit provided in such prior art patent was contemplated to be moved directly to a retail outlet, such as a local store, and raw milk would be brought to the location of such retail outlet from the farm, whereat the milk would be processed and either immediately stored under refrigeration or sold as the milk was taken from the unit. The general concept of this prior art mobile milk processing unit, therefore, was not to provide an increased economic advantage to the farmer who wished to process his own milk and sell it directly on his farm, but instead merely provided an economic advantage to the operators of the milk processing plants. In short, this prior suggestion gave the farmer no advantage whatsoever but merely facilitated retail distribution of the processed milk by having the farmer bring his raw milk to the retail location where the mobile unit was located rather than to some centralized stationary plant for processing and further redistribution.

SUMMARY OF THE INVENTION

With the above background in mind, the primary thrust and objective of the instant invention is to provide a milk processing system by which the farmer is enabled to sell homogenized and pasteurized milk directly from his own farm. To this end, the thrust of the instant invention is to place the farmer in a position to deal directly with the ultimate milk consumer by marketing on his own farm homogenized, pasteurized, and packaged milk. Consistent with this thrust of the instant invention and as an objective thereof, Applicants contemplate the provision of a mobile pasteurizing, homogenizing and packaging system for milk and specifically a system which, for example, can be completely carried and moved on a conventional truck, such as tractor/trailer type unit directly to the farm.

Obviously, these objectives could not be implemented simply by following conventional techniques and miniaturizing or making mobile the reinforced building structures and complex boiling systems incorporated at conventional stationary milk processing plants. In achieving the results desired by the instant invention, therefore, it was necessary to depart from such conventional techniques, particularly as concerns operation of the conventional pasteurizer.

Specifically, and as will be explained in more detail hereinbelow, a conventional pasteurizer such as those found at stationary milk processing plants is required to be both heated and cooled at controlled temperatures. With a complex steam boiler arrangement such as is provided in conventional stationary processing plants, such temperature control can readily be maintained and the utilization of the steam boiler arrangement is practical. This practicality of temperature maintenance utilizing a steam boiler as is the case with the conventional stationary plant becomes an impracticality where a mobile unit is desired due to the necessary size and structural requirements.

Thus, a particularly significant problem to be faced when attempting to provide a mobile milk processing plant is the problem of operating the pasteurizer unit in a practical fashion and particularly in maintaining a proper temperature control thereof. It is simply impractical to utilize fuels such as oil, gas or coal along with some kind of conventional boiler (as was attempted with said prior art mobile processor) mounted on a mobile unit, and the desired results of economical milk processing could not therefore be obtained. Electricity as the medium providing the requisite source of power was also not thought to provide the desired results either because most mobile and/or motorized vehicles, in general, do not have their own built-in source of the large amount of electricity needed, the batteries and generators or alternators associated with the motors of such vehicles certainly not being sufficient to provide the type of power required for operation of the pasteurizer and related systems. In addition, to provide a mobile unit which had electrical connections which could "plug-in" at any given location presents a practical problem in some instances, due to the cost of electricity and/or the availability of multiphase power, and/or the cost of installation of multi-phase power where it is not existent.

Bearing in mind the foregoing factors, it should be appreciated by those skilled in the art that there was no readily apparent manner in which a mobile milk processing plant of the type which could be brought directly to the farm could be provided and, in this respect, the concept of the instant invention was previously thought to be wholly impractical. However, and consistent with this invention, a practical milk processing plant which indeed is mobile and which can be brought directly to the farm has been developed.

To this end, the instant invention provides a combination of features, devices, and/or units which have been assembled in a self-containing mobile vehicle so that the milk is pasteurized in a conventional pasteurizer, homogenized in a conventional homogenizer, and packaged in a conventional unit. In addition and as a supplement to this combination, however, the mobile unit of the instant invention derives its power for operation of the component parts from an auxiliary electrical generator. In a conventional truck assembly such as a tractor-trailer there is normally provided some convenient power take-off point or unit there of and the instant invention utilizes such available power take-off so as to drive the auxiliary generator, which generator is of sufficient size so as to operate all supporting processing equipment. Although efficiency dictates utilizing the truck motor to drive the auxiliary generator, those skilled in the art will appreciate that a separate motor could be provided to drive the generator, if so desired.

In addition to the conventional pasteurizer, homogenizer, packaging unit, and the auxiliary generator above-discussed, a completely operative mobile milk processing system must further necessarily include heating and cooling systems for the pasteurizer unit. As is known, conventional pasteurizer units utilize circulating hot and cold water so as to perform their pasteurizing function. The heating and cooling systems contemplated for use with the instant invention, however, cannot be conventional in all respects although the individual heating and cooling units themselves can be standard available commercial items.

More particularly, and as concerns a conventional stationary milk processing plant, cooling of the circulating water is effected by the provision of a low horsepower refrigerating unit which generally is utilized to build an ice bank overnight whereby refrigeration of the water can be achieved by passing the circulating water over the ice bank during the daily hours of operation of the plant. With a mobile unit, however, the size of such conventional refrigeration systems would be prohibitive and, in addition, with a mobile unit, it is desirable to have instantaneous cooling so that the mobile processing unit can be operated 24 hours a day if so desired. As should be appreciated, the more a mobile unit can be utilized by virtue of moving it from farm to farm, the better the economic return on the investment. Accordingly, and as a further component part of the combination comprising the instant invention, the refrigerating unit to be used therein is one exhibiting an increased capacity so as to eliminate the need for the conventional ice bank and so as to provide instantaneous refrigeration. This increase in capacity is such that the cooling unit of the instant invention departs from the cooling unit of conventional arrangements.

Likewise, the instant invention provides a heat generation unit or mechanism for the circulating water which departs from the conventional types. Specifically, instead of having a relatively large size heating unit such as the boiler room discussed above with respect to stationary milk processing plants, the instant invention contemplates the utilization of a small heat generator which is itself electrically powered. Size requirements of the heat generator of the instant invention depend on the overall assembly, but it has been found that a unit which has a capacity of approximately one-thirtieth the volume of a typical small boiler room provides satisfactory operation. Viewed in this respect, the combination of component parts of the instant invention is such as to increase the capacity of the refrigeration unit from that which is conventionally used, while simultaneously decreasing the size of the heating unit which is conventionally used in stationary milk processing plants.

Taking all these factors of the overall inventive combination into consideration, it will therefore be seen that the combination includes, in its most basic sense, a pasteurization unit, a substantial sized electrical generator driven either by the motor or power for the mobile unit itself, or by an auxiliary motor, a large capacity refrigeration unit, and a small sized heat generator, all mounted upon a movable vehicle. The combination of the instant invention further desirably includes a homogenizer unit and a filling and packaging unit, all driven off the same electrical power supply.

Even taking into account all the aspects of the combination discussed above incorporated in the mobile unit of the instant invention which depart from the conventional stationary milk processing plant units, the resultant apparatus still would not necessarily provide the desired result. More particularly, and as concerns a conventional stationary milk processing plant, the temperature of the pasteurizer is controlled by injecting steam into the circulating hot water so as to maintain the desired temperature level. In a mobile unit, however, it is undesirable and impractical to generate such steam and, according to the teachings of the instant invention, steam-generation has been found to be unnecessary. Specifically, and consistent with the instant invention, an aquastat or sensing unit disposed in the circulating water line serves to effectively turn the heat generator on and off so as to maintain the circulating hot water temperature at a desired level, or more particularly, within a desired range of several degrees. Further, and while the aquastat technique of turning the heat generator on and off has proved to be satisfactory in operation, alternative techniques to obtain temperature control of the circulating water can be used. For example, the rate of hot water flow can be controlled so as to maintain the desired operating heat exchange components of the pasteurizer at a desired level, and/or a by-pass system can be used wherein a certain portion of the circulating water by-passes the heat generator, with another portion of the circulating water passing therethrough under valve control so as to maintain the desired temperature level.

Obviously, in any milk processing plant including the mobile unit of the instant invention, it is necessary to have a source of water intake and some means for handling the discharge from the mobile unit. However, with the advent of conventional campers, most of these problems have been solved and the instant invention merely takes advantage of the fact that virtually any mobile unit can be connected to conventional water supply and sewage disposal facilities, each of which are available at almost any location, including a farm. It should be noted, in this respect, however, that the instant invention requires no special water intake or sewage disposal facilities.

As will therefore be appreciated, the instant invention resides not only in the apparatus and combination of components which provides a commercially feasible mobile milk processing plant, but in the method or technique by which the milk processing and distribution thereof are effected.

BRIEF DESCRIPTION OF THE DRAWINGS

The invention will be better understood and features and advantages other than those set forth above will become apparent from the following detailed description of a preferred inventive embodiment, such description referring to the appended sheets of drawings, wherein:

FIG. 1 is a side view, partially broken away for illustrative clarity, depicting a mobile milk processing plant constructed in accordance with the instant invention;

FIG. 2 is a schematic plan view of the unit depicted in FIG. 1;

FIG. 3 is a side sectional view of the trailer portion of the unit depicted in FIG. 1, taken from the opposite side as that depicted in FIG. 1;

FIG. 4 is a schematic plan view similar to that of FIG. 2, but additionally depicting flow paths for milk being processed in accordance with the instant invention;

FIG. 5 is a schematic view depicting milk and water flow through the pasteurizer unit along with temperature zones; and FIG. 6 is a schematic illustration depicting the connections of various electrical units utilized to distribute electric power in accordance with the preferred embodiment of the instant invention.

DETAILED DESCRIPTION OF THE DRAWINGS

Referring now to the drawings, it should be noted that the mobile milk processing plant of the instant invention generally designated by reference numeral 2 is disposed upon a movable vehicle which preferably includes a tractor 4 and a trailer 6. In the preferred inventive embodiment, tractor 4 comprises a conventional deisel tractor such as is available from many manufacturers. Trailer 6 also is of conventional design and preferably is of a configuration commonly known in the trucking trade as a closed "electronics van." Tractor 4 is coupled to the trailer section 6 through a conventional fifth wheel assembly 8 so that the tractor serves to pull the trailer section. It should be apparent that the drive, wheels, and other parts of the respective tractor and trailer units do not depart from conventional design and, it should be noted that the movable vehicle of the instant invention can be of virtually any type so as to incorporate the processing system to be described herein below.

Continuing, an auxiliary and oversized generator generally designated by reference numeral 10 is preferably mounted on the tractor 4 immediately behind the cab, though it should be appreciated that generator 10 could be mounted in any suitable location. Generator 10 is preferably driven directly from a power take-off connection 12 provided on the drive shaft 14 of the tractor which leads from a non-illustrated transmission of the deisel engine. Of course, and as discussed, generator 10 could be driven by an independent motor, though at an economic disadvantage.

Generator 10 preferably has an output rating of a minimum of 100 kilowatts although the only requirement for the generator is that its power output be sufficiently great to service the refrigeration means and heat generation means of the pasteurizer, as well as to run the remainder of the related equipment in the combination. As should further be appreciated, a separate auxiliary generator such as generator 10 is required for producing the requisite amount of power since the normal alternator or generator found in deisel or gasoline engines, for example, certainly would not be sufficient for this purpose. Further, the utilization of a so-called "oversized" electrical generator enables the heat generating equipment to be of small physical size, due to the relatively large amounts of power available.

The trailer 6 of the mobile unit 2 of the instant invention is preferably contemplated to be divided into a plurality of internal compartments, such as forward compartment 18 and a rearward compartment 20 with the forward compartment 18 being of relatively smaller size. The forward compartment 18 can be termed a service compartment, whereas the rear compartment 20 is contemplated to contain the bulk of the milk processing equipment.

The forward or service compartment 18 incorporates an electrical distribution panel 22 which serves to distribute electrical power from the auxiliary generator 10 to the milk processing equipment. An enlarged schematic view of a typical disposition of the various electrical switches and the like can be seen in FIG. 6, although any suitable disposition and connection of components could be utilized.

Also contained within the service compartment 18 is an electrical heat generation unit 26 which, as discussed previously, can operate in several modes depending on whether a by-pass system is used, an aquastat system is used, and/or a velocity control system is used for regulating the temperature of the circulating water. It will be recalled that the circulating water is utilized as the heat exchange or transfer medium for maintaining proper temperatures in the pasteurizer to be discussed hereinbelow. The electric heat generator contemplated for utilization with the instant invention can be of conventional construction, such as manufactured by Electro-Pak, Inc., Reading, Pa., with a 48 kilowatt hour rating. Of course, it should further be appreciated that the various ratings of the individual components described herein can be adjusted or altered in capacity depending upon the capacity of the pasteurizer and related components. The heat generator 26 is, as aforementioned, operated directly from the auxiliary electrical generator 10 through the electrical distribution panel 22, and basically includes a heating chamber into which a plurality of heating rods project so as to transfer heat therefrom to circulating water passing therethrough.

A refrigeration unit 24 is likewise provided within the service compartment 18 and, in the contemplated preferred embodiment, such refrigeration unit could be a unit known as a so-called "instant chiller" as manufactured by Chester Jenson Comapny, Chester, Pa., having a load rating of 12½ tons and a flow capacity of 60 gallons per minute. A compressor 16 for the refrigeration unit 24 is disposed through the forward wall of the compartment 18 and it should be appreciated that refrigeration unit 24 along with its associated compressor 16 are likewise operated from the electrical generator 10 through the electrical distribution panel 22. In known manner, compressor 16 serves to compress a low vaporization temperature gas, such as Freon, and injects same into the refrigeration unit 24 so as to cool a pair of plates over which water is circulated.

Having now described the service section or compartment 18 of the trailer 6, attention can be directed to the operational section thereof, namely the milk processing section found in the rearwardly disposed compartment 20. Disposed within this section is a pasteurizer unit 30, a homogenizer unit 32, a holding tank 34, and a filling and packaging machine 36. Each of these basic milk processing components are contemplated to be of conventional design. For example, pasteurizer 30 could comprise a De Lavel unit with a 500 gallon per hour capacity. Homogenizer 32 could comprise, for example, a Galuin homogenizer having the same capacity as the pasteurizer. A packaging and filling machine could comprise, for example, a "Pitcher Pak" unit as distributed by Adem, Inc., Everett, Mass. A capacity of the packaging and filling machine which has been found to be particularly suitable for use with the mobile combination is 20 half-gallons per minute.

The manner in which raw milk flows through the system and the various auxiliary units provided which will be discussed below can best be understood by reference to FIG. 4 of the appended drawings. In FIG. 4, raw milk is shown as entering the mobile unit of the instant invention via line 50, and passing to a raw milk pump 40, pump 40 essentially serving to bring the milk from its storage location in the farm tank into the mobile unit. The milk passes to a clarifier 42 from the raw milk pump 40, which clarifier serves to separate the impurities from the milk and, more particularly, the solid impurities therein. Such clarifiers are well-known to the art and need not be described further. The milk next passes, from the clarifier, to a balance tank 44 which essentially comprises an open tank. The balance tank 44 serves to insure that the milk coming to the pasteurizer 30 from the clarifier 42 is not under pressure, so that the pasteurizer 30 and the homogenizer 32 operate under the various requisite pressure levels determined by the homogenizer, without outside influence. In this respect, and as will be briefly explained, the homogenizer and the pasteurizer operate together, with the homogenizer initially drawing milk by suction through the pasteurizer, and then feeding milk back into the pasturerizer under pressure, as is known.

The raw milk makes it first run or pass through pasteurizer 30 from the balance tank 44 and then flows to the homogenizer 32 from which it is returned to the pasteurizer 30 and cooled before moving to a holding tank 34. Holding tank 34 serves to store the milk as it is being processed so that the milk can be pumped, without internal pressure influence, to the packaging and filling machine 36.

The specific operation of the pasteurizer can be understood by reference to FIG. 5 of the appended drawings, though the operation of the pasteurizer is conventional. The pasteurizer 30 essentially incorporates a cooling section 60, a regeneration section 62 and a heating section 64. Heated water is circulated through lines 65, while cooled water is circulated through the lines 67 in the respective sections of the pasteurizer. And, by the use of circulation pumps 65a, 67a as aforementioned, the refrigeration and heating units disposed within the service compartment 18 of the mobile unit effect the requisite heating and cooling of the circulating water.

The specific operation of pasteurizer 30 of the instant invention is such that raw milk from the balance tank 44 enters the pasteurizer via line 66 passing into one side of the regeneration section where the raw milk is partially heated and then flows under suction to the homogenizer 32 at a temperature of approximately 138°. From the homogenizer 32, the milk returns via line 68 to the hot or heated section 64 of the pasteurizer where the milk is further heated to a temperature of approximately 170°. At this point, the hot milk is under pressure and, after being heated to 170°, passes through a so-called "holding tube" which, in fact, conventionally comprises a series of tubes wherein the milk is held for a minimum of 15 seconds and preferably for 18 seconds so as to permit the milk to be maintained at the 170° temperature for a sufficient length of time to achieve pasteurization. Were it not for such holding tubes, the milk would come from the hot section of the pasteurizer directly into the regeneration section thus cooling this section and eliminating the pasteurization effect which was desired by the heating in the first place, as is known.

The returning milk then passes through the regeneration section and subsequently through the cold section, passing on to the holding tank 34 at a temperature of approximately 38°. As can be appreciated, a so-called "instant chill" has therefore been imparted to the milk as above-described.

In the regeneration section, milk entering line 66 and passing therethrough is cold, whereas the milk returning from the holding tubes and, in particular, the hot section 64, is hot. This provides a counter balance between hot and cold, thereby effecting a heat transfer relationship with an efficiency on the order of 75 percent.

Once the milk is so processed, the milk passes to the packaging and filling machine generally designated by reference numeral 36 which, as above-described, is conventional in the art. Specifically, the filling machine contemplated for utilization with the instant invention is of the variety wherein a flexible plastized material is utilized as a container for the milk and the milk is filled therein, the filled container then passing onto a roller conveyor to be discharged from the mobile unit.

As should be appreciated by those skilled in the art, the particular placement and disposition of the various units comprising the mobile unit of the instant invention can be varied, as desired, so as to accommodate specific requirements.

As should further be appreciated by those skilled in the art, the provision of the novel mobile milk processing system of the instant invention will enable a new mode or method of handling raw milk which completely departs from conventional distribution techniques. In this respect, and with the mobile unit of the instant invention which incorporates the milk processing and packaging plant, the unit can be moved directly to the location of a source of supply of raw milk, such as the farm, wherein the raw milk is delivered to the mobile unit and processed, and then subsequently discharged at the same farm location. The mobile unit could then be moved to the next farm, whereat the process would be repeated in succession. Accordingly, the provision of this mobile unit enables the farmer, the supplier of the raw milk itself, to process the raw milk on his property, and then sell the milk to the public.

The objects initially set forth at the outset to this specification have been successfully achieved. ACCORDINGLY,

What is claimed is:

1. A mobile unit for processing raw milk at the location of a source of supply thereof, said unit comprising a movable vehicle having disposed thereon:
   a. a milk processing assembly including at least a pasteurizer, means for delivering raw milk thereto, and means for discharging processed milk therefrom;
   b. means for circulating water through said pasteurizer as a direct heat transfer medium for the milk in said pasteurizer;
   c. electrically operable temperature conditioning means for selectively heating and cooling the circulating water to respectively heat and cool the milk in said pasteurizer; and
   d. an electrical generator for providing the entire electric power for operating at least said milk processing assembly and said temperature conditioning means.

2. A mobile unit as defined in claim 1, wherein said movable vehicle is a motorized vehicle, and wherein said electrical generator is driven by the motor of said vehicle.

3. A mobile unit as defined in claim 1, wherein said temperature conditioning means comprises an electrical refrigeration unit and an electrical heat generation unit powered by said electrical generator.

4. A mobile unit as defined in claim 3, wherein said means for circulating water comprises an electrical pump.

5. A mobile unit as defined in claim 4, wherein said milk processing assembly further includes a homogenizer, said pasteurizer and said homogenizer both being electrically powered by said electrical generator.

6. A mobile unit as defined in claim 5, wherein said milk processing assembly further includes a milk filling and packaging means.

7. A mobile unit as defined in claim 3, wherein said temperature conditioning means includes a bypass means for bypassing a portion of the heated circulating water around said pasteurizer to thereby control the amount of heat transferred to the milk in said pasteurizer.

8. A mobile milk processing unit as defined in claim 1, wherein said vehicle comprises a motorized tractor and a trailer, wherein said electrical generator is disposed on said tractor and driven by the tractor motor, and wherein said trailer carries said milk processing assembly.

9. A mobile unit as defined in claim 8, wherein said trailer is divided into at least two compartments, said milk processing assembly being disposed in one of said compartments, said heat generation unit and said refrigeration unit being disposed in another of said compartments.

* * * * *